(12) United States Patent
Tuli

(10) Patent No.: US 10,303,496 B2
(45) Date of Patent: May 28, 2019

(54) SYSTEM FOR REDUCING USER-PERCEIVED LAG IN TEXT DATA INPUT AND EXCHANGE WITH A SERVER

(71) Applicant: Raja Singh Tuli, Montreal (CA)

(72) Inventor: Raja Singh Tuli, Montreal (CA)

(*) Notice: Subject to any disclaimer, the term of this patent is extended or adjusted under 35 U.S.C. 154(b) by 351 days.

(21) Appl. No.: 15/366,631

(22) Filed: Dec. 1, 2016

(65) Prior Publication Data

US 2018/0157501 A1  Jun. 7, 2018

(51) Int. Cl.
| | |
|---|---|
| G06F 9/451 | (2018.01) |
| G06F 3/0481 | (2013.01) |
| G06F 3/0482 | (2013.01) |
| G06F 3/0484 | (2013.01) |
| G06F 3/0489 | (2013.01) |
| G06F 17/24 | (2006.01) |
| H04L 29/08 | (2006.01) |
| G06F 17/22 | (2006.01) |

(52) U.S. Cl.
CPC ............ G06F 9/452 (2018.02); G06F 3/0482 (2013.01); G06F 3/0489 (2013.01); G06F 3/04812 (2013.01); G06F 3/04842 (2013.01); G06F 17/227 (2013.01); G06F 17/24 (2013.01); H04L 67/2828 (2013.01)

(58) Field of Classification Search
CPC ...................................... G06F 9/452
USPC ...................................... 715/744
See application file for complete search history.

(56) References Cited

U.S. PATENT DOCUMENTS

| | | | | |
|---|---|---|---|---|
| 6,633,314 B1* | 10/2003 | Tuli | ..................... | G06F 16/9577 715/744 |
| 6,941,382 B1* | 9/2005 | Tuli | ..................... | G06F 16/9577 709/247 |
| 7,356,570 B1 | 4/2008 | Tuli | | |
| 8,201,093 B2 | 6/2012 | Tuli | | |
| 2002/0030843 A1* | 3/2002 | Tuli | ................... | H04N 7/17318 358/1.15 |
| 2004/0160637 A1* | 8/2004 | Tuli | ................... | H04N 7/17318 358/1.15 |
| 2010/0115454 A1* | 5/2010 | Tuli | ..................... | H04L 67/2861 715/780 |
| 2010/0257450 A1* | 10/2010 | Go | ......................... | G06F 3/0481 715/733 |
| 2014/0325362 A1* | 10/2014 | Potts | ..................... | G06F 17/211 715/732 |
| 2015/0012831 A1* | 1/2015 | Boggess | ............... | G06F 3/1454 715/733 |

(Continued)

*Primary Examiner* — Jason C Olson

(57) ABSTRACT

The invention discloses a system for accessing and viewing Internet content on a portable device by means of a proxy server. The server requests web content, renders it and sends compressed image parts to the device. In order for the device to be cost-competitive, its processing operations are generally limited to decompressing image parts and displaying them. The server sends information to the device that allows it to locally create, display and manage text boxes, in which the user can type immediately. As a user types into a local text box, text input data is communicated to the server and processed therein before further requests for web content. By simultaneously managing multiple text boxes locally, the present invention reduces instances of data transfer from the server to the device, which decreases the likelihood of lag and improves the performance of the device.

44 Claims, 4 Drawing Sheets

(56) References Cited

U.S. PATENT DOCUMENTS

2018/0157501 A1* 6/2018 Tuli .................... G06F 17/227

* cited by examiner

SYSTEM FOR REDUCING USER-PERCEIVED LAG IN TEXT DATA INPUT AND EXCHANGE WITH A SERVER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not applicable

BACKGROUND OF THE INVENTION

Field of the Invention

This invention generally relates to a host computer system that allows the user of a Portable Device to access the Internet and World Wide Web by means of a wireless network. The Portable Device displays the web page image to the user, allows the user to navigate the web page and relays user input to the Proxy server. More specifically, the present invention discloses an interface display management method that reduces the lags perceived by the user of a Portable Device before inputting text data inside text box elements of a web page and in the display of said text data input on the display screen of the Portable Device.

Description of the Related Art

Aspects of the prior art that are necessary for explaining the present invention include U.S. Pat. Nos. 8,201,093 and 8,176,428 by the same Inventor.

As used in this specification and in the prior art, the term "web page server" designates a computer system that is separated from both the Portable Device and the Proxy server by a certain distance, and which communicates with both by means of a network. Communications between the web page server and the Portable Device are performed through the Proxy server. In most situations, the web page server provides access to the content of a web page in a website—for instance, Yahoo, Google, CNN or similar ones.

As used in this specification and in the prior art, the term "Proxy server" designates a computer system that is separated from both the Portable Device and the web page server by a certain distance, and which establishes the communication link between both by means of a network. Through this network, content is received from the web page server by a Proxy server, where it is rasterized and compressed before the Proxy server can transmit rasterized and compressed data to the Portable Device. The Proxy server can also communicate with the Portable Device and send to it, as well as receive from it, vector or ASCII content. The Proxy server typically runs applications, such as a web browsing application, according to default or user instructions.

As used in this specification and in the prior art, the term "Portable Device" designates an electronic device that is of reasonably small dimensions and that incorporates an integrated keypad. The functions of the Portable Device include allowing data entry by the user, relaying user input to other computers and displaying information received from other computers, typically a Proxy server. The Portable Device is capable of receiving both vector, ASCII and raster data and is capable of transmitting vector and ASCII data. The Portable Device communicates to other computers by means of a network, usually through a Proxy server.

When a user requests a web page, content for that web page is transmitted from the web page server to the Proxy server. The Proxy server then divides this received content into blocks of data, compresses these blocks and sends them along with some information to the Portable Device, which, upon reception, decompresses these blocks and processes the information so that an image of the web page can be displayed on the Portable Device's screen. In the preferred embodiment of prior art disclosed herein, information and blocks of data are sent in a specific order of priority. In this standard order, the Proxy server only sends content for the display area of the Portable Device, followed with data and information for a small field around the displayable area of the Portable Device. For each of these two sequences of data transmission, the Proxy server first sends graphic elements such as pictures and text boxes, which are followed by blocks of data constituting non-graphic elements, like text. In the preferred embodiment of prior art disclosed herein, blocks of data received from the Proxy server are stored in a display memory of the Portable Device, ready to be instantly displayed should the user scroll over them.

Communications between a Portable Device and a web page server, which interact through a Proxy server in a network, regularly involve text data input by the user. To allow the user to perform text entry or editing, text boxes are commonly relied on by web page designers. A generic text box, text field or text entry box is a common element of the Graphical User Interface ("GUI") of computer programs, with the purpose of allowing the user to input text information to be processed by a program. Text boxes may contain zero, one, or two scrollbars. Some text boxes display a blinking vertical line popularly known as cursor, indicating the current region of text being edited.

The prior art method disclosed in U.S. Pat. No. 8,201,093 aims to avoid the multiple and continuous transmissions of data to and from the Proxy server when text boxes are displayed as raster images, and text data input is processed by the Proxy server along the user entering this text information. In this method, any of the web page's text boxes that is currently ready and able to receive text input is graphically represented by a locally-created text box overlaid at the same position on the image of the web page stored into the Portable Device's memory and displayed on the Portable Device's screen. Each of these local text boxes are created by software run by the Portable Device's Central Processing Unit ("CPU"), upon their corresponding text box at the Proxy server being activated at the Proxy server for text input. At that moment, the Proxy server sends to the Portable Device identifying information for the text box, and the Portable Device's CPU uses this information to create a corresponding local text box. Only one local text box, if any, can be run and displayed at any given time. In these local text boxes, the Portable Device's CPU immediately receives text data input and renders it for display on the Portable Device's screen, with no delay perceived by the user between typing and display. Moreover, the text box in the Proxy server is not updated continuously as the user types in text, but only when the user performs an action that indicates that typing in the local text box is complete. Thereupon, the Portable Device sends the text data input entered in the local text box in vector or ASCII format to the corresponding text box in the Proxy server, where this text input is processed. This sequence is repeated every time a text box is activated in the Proxy server.

When network congestion imposes a lag on communications between the web page server and the Proxy server, this inconvenience is partly circumvented in the prior art by having the Proxy server sending in priority to the Portable Device the information necessary to create and display the local text box corresponding to the text box in the web page, if any, that is activated and ready to receive text the moment the web page is loaded. This method allows the user to enter text for this text box at the Portable Device as soon as possible, even if the rest of the web page image is not yet displayed. This priority order for data transmissions, which applies when a web page is loaded, is replicated in the principal embodiment of this invention.

However, in this prior art method, the multiple operations and transmissions of information when another text box is activated for text entry can produce perceptible delays before text input may be typed in a locally-created text box and displayed on the Portable Device's screen. The communications to and from the Proxy server are subject to delays because of the distance itself, as well as the possibility of network congestion anywhere in the intermediary connections such as servers, hubs, satellites and similar devices. These delays and the absence of immediate display are perceived by the user. If the web page that is currently navigated contains many text boxes, for instance a web page where the user has to fill in a form, these inconveniences are potentially repeated every time the user switches from one text box to another, which, for the user can be distracting and irritating as well as impart a sensation of poor system performance.

BRIEF SUMMARY OF THE INVENTION

The principal embodiment of this invention discloses a new and different process for the display and management of web pages' text boxes on the screen of a Portable Device, which process reduces the likelihood and duration of delays before a user's text input is displayed thereon.

In a principal embodiment, when loading a web page, the transmission from the Proxy server to the Portable Device of information identifying all of the text boxes located in the part of the web page image that is transmitted is assigned first priority over any other content of said part of the web page image, and it is transmitted as soon as a text box is detected. Identifying information for text boxes includes their graphic location, their size, their preliminary content, their preliminary cursor position and the features of their scrollbar(s) and drop-down menu(s), if any. Among those sets of information, priority is given to the information necessary to create and display the local text box corresponding to the text box in the web page, if any, that is activated and ready to receive text the moment the web page is loaded. Once identifying information for any text box is received by the Portable Device, its CPU creates a corresponding local text box and displays it overlaid on the web page image stored into the Portable Device's display memory at the same position as its corresponding text box in the Proxy server.

Although these locally-created text boxes are all available for receiving text input upon their creation, only one locally-created text box is enabled to readily receive text input typed by the user and process it at any given time. Since locally-created text boxes are managed locally by the Portable Device's CPU, switching enablement to another local text box is also processed by the Portable Device and thus instantaneously, without interference by the Proxy server, and without being susceptible to network congestion. This switch can be activated with the user clicking on another local text box or pressing "TAB".

In this invention, all of the locally-created text boxes overlay the web page image whose parts have been sent from the Proxy server and stored into the Portable Device's display memory. So long as the web page is navigated, these local text boxes remain in position, and they display their preliminary content and any text input or editing entered previously by the user. The Proxy server thus never has to send back updated data for text box images to the Portable Device.

Unlike in the prior art method, text data in a local text box in the Portable Device is transmitted along in vector or ASCII format to its corresponding text box in the Proxy server as the user types in or edits the content of the local text box. Upon reception, which could be delayed, the text box in the Proxy server is updated by merging its preliminary or previously-saved content, if any, with the content just received from the Portable Device. If there is no preliminary or previously-saved content inside the text box in the Proxy server, it is updated by simply incorporating the content just received from the Portable Device. The content of a local text box is also sent in vector or ASCII format to the Proxy server, and processed therein, when the user performs an action that indicates that typing in the local text box is complete. If this action is interpreted by the Proxy server as a command from the user, such as loading a new web page, the Proxy server then executes this command after processing queued operations.

In an alternate embodiment, anytime a new web page is loaded on the Proxy server's virtual display, the order of priority is different: blocks of the web page image are transferred from the Proxy server to the Portable Device as the first priority of data transmission, over information identifying text boxes in the web page.

Hence, the present invention reduces the likelihood and duration of delays before a user can begin typing in a locally-created text box, and before this text input is processed and displayed on the screen of the Portable Device. Since the Proxy server never sends back updated data for text box images to the Portable Device, this invention also reduces the amount of data uploaded by a Portable Device, therefore conserving on bandwidth consumption. The performance of the Portable Device can thereby be increased without affecting its cost-competitiveness.

The above as well as additional features and advantages of the present invention will become apparent in the following written detailed description.

BRIEF DESCRIPTION OF THE SEVERAL VIEWS OF THE DRAWINGS

The invention is described in more detail below with respect to an illustrative embodiment shown in the accompanying drawings in which.

Where used in the various figures of the drawings, the same numerals designate the same or similar parts.

DETAILED DESCRIPTION OF THE INVENTION

Figure 1:
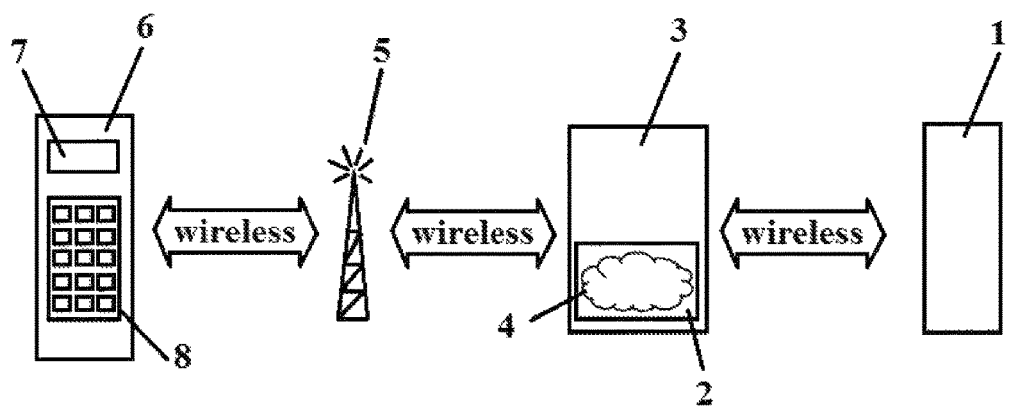
FIG. 1 is a schematic drawing illustrating the basic elements of the network and the flow of data between these elements, according to the present invention and the prior art.

In order to eliminate ambiguities, some of the terms used in the following description are defined.

As used herein, the term "Text Box" designates the back-end application operator involved in the actual processing of the user-input text data by an application, which typically runs in a Proxy server. The corresponding front-end is the Dynamic Local text box displayed by the Portable Device's GUI system. A particular Dynamic Local text box displayed in the Portable Device is a mere representation of its uniquely corresponding Text Box that is in the Proxy server.

More specifically, the term "Dynamic Local text box" designates a graphic element displayed on the Portable Device's screen by its GUI system and overlaid on specific display areas of the Portable Device's screen according to instructions received from the Proxy server. The user can input data to a Dynamic Local text box in the form of text or graphic symbols, as well as edit such data. Text data input that the user types on the Portable Device's integrated keypad is rendered locally into the Dynamic Local text box by the Portable Device's CPU and thus can be seen by the user in real time.

As used herein, the terms "enable" and "disable" apply to the various instances of Dynamic Local text box that are depicted in the Portable Device. An instance of the Dynamic Local text box is said to be enabled when it is ready and capable of receiving the input text typed in by the user on the Portable Device's integrated keypad, which is then rendered on the Portable Device's screen in real time by its CPU. In other words, if the user types text, this text input is only entered and rendered in the Dynamic Local text box that is enabled, if any. To indicate to the user that a certain Dynamic Local text box is enabled and thus available and ready to receive text input, visual cues are typically activated by the Portable Device, such as a temporary highlighting of the perimeter of the enabled Dynamic Local text box in a different color, or a blinking text cursor.

As used herein, the term "active" applies to a Text Box, if any, that runs in the Proxy server. A Text Box is said to be active when it is ready and capable of receiving text input from its corresponding Dynamic Local text box and processing it as per instructions of the Proxy server's browser. The "currently active Text Box" designates the specific Text Box presently selected for data entry in the Proxy server's browser. The "primary Text Box" refers to a Text Box that is active by default when a web page is accessed, in accordance with the web page's settings. No more than one Text Box can be active at any given time.

As used herein, the term "Typing Interruption Prompt" designates a specific signal that the Portable Device communicates to the Proxy server whenever the user's actions indicate that typing into an enabled Dynamic Local text box is complete. The different sequences of events that can result from a Typing Interruption Prompt are each further described below. A Typing Interruption Prompt is caused by the user's clicking actions or by pressing on certain command keys, either by using a standard key on the Portable Device's integrated keypad or screen keys on a Portable Device's touch-sensitive screen, if it has one. More precisely, actions that can produce a Typing Interruption Prompt include the following:

The user clicking on a command button on the Portable Device's display screen. Command buttons act as virtual command keys.

The user clicking on another Dynamic Local text box element.

The user clicking on neither a text box element nor a command button of the display area.

The user clicking on an item of a drop-down menu. When attached to a text box, a drop-down menu is a graphical element, temporarily displayed as a list of vertically-stacked elements below the text box, that suggests different options that the user can choose to click on. Doing so updates the content of the text box and can, depending on the settings of the drop-down menu, cause a new web page to be loaded.

The user pressing on the "ENTER" command key. In this invention, pressing on the "ENTER" command key while a Dynamic Local text box is enabled always shifts the cursor inside the Dynamic Local text box to a next line, after which a signal is sent to the Proxy server. The Proxy server interprets the signal as a Typing Interruption Prompt only when the Internet application currently run operates in web browsing mode. If the Internet application operates in electronic mail mode, the Proxy server processes this signal as a simple input to shift the cursor to the next line in the corresponding Text Box.

The user pressing on the "TAB" command key. Pressing on the "TAB" command key amounts to clicking on the next text box available on the web page, in accordance with the order configuration and instructions of each specific web page as relayed by the Proxy server's browser.

Prior Art (U.S. Pat. No. 8,201,093)—Inefficient Delays

In the prior art method disclosed in U.S. Pat. No. 8,201,093, the multiple operations and transmissions of data information when a web page is loaded or when a Typing Interruption Prompt is triggered can produce perceptible delays before text input may be typed in Dynamic Local text boxes and displayed on the Portable Device's screen. The communications to and from the Proxy server are subject to delays because of the distance itself, as well as the possibility of network congestion anywhere in the intermediary connections such as servers, hubs, satellites and similar devices. For instance, when the user presses "TAB" to switch to the next Dynamic Local text box, the Portable Device transmits data for the currently enabled Dynamic Local text box to the Proxy server where this data is processed; the output of this processing must be sent back to the Portable Device and decompressed therein before the Portable Device displays it on its screen for the user. Only thereafter is the next Dynamic Local text box enabled for local text entry and display. Any problem of network congestion intervening in these operations and transmissions hinders the user from entering text input that can be immediately displayed (in the meantime, text input by the user is only saved in a buffer memory of the Portable Device, without display).

These delays and the absence of immediate display are perceived by the user. If the web page that is currently navigated contains many text boxes, for instance a web page where the user has to fill in a form, these inconveniences are potentially repeated every time the user switches from one Text Box to another, which, for the user can be distracting and irritating as well as impart a sensation of poor system performance.

Principal Embodiment—Information for all Text Boxes Sent Immediately—General Description The principal embodiment of this invention discloses a new and different process for the display of web pages' text boxes on a Portable Device's screen, which process reduces the likelihood and duration of delays before a user's text input is displayed on the screen.

As in the prior art, when the Proxy server divides a web page loaded on its virtual display into distinct elements, it first identifies, for instance by analyzing the HTML content received from the web page server, the web page's graphic elements such as pictures and text boxes, and it treats each of them as a distinct block of data that is eventually transmitted to the Portable Device and stored into a memory therein. In a preferred embodiment of this invention, a copy of these blocks is also stored into a display memory of the Portable Device, from which the web page image and Dynamic Local text boxes are displayed. In the general embodiment of this invention, the transmission from the Proxy server to the Portable Device of identifying information for a web page's primary Text Box—such as its graphic location, its size, its preliminary content, its preliminary cursor position and the features of its scrollbar(s) and drop-down menu, if any—is assigned first priority over any other content for the web page as soon as the primary Text Box, usually the first text box element in a web page, is detected. If the Proxy server is already sending to the Portable Device data for other parts of the web page image, it momentarily interrupts this transmission to rather communicate identifying information for the primary Text Box, after which it continues to relay data and information for the remainder of the web page image.

Once information for the primary Text Box, if there is one, is received by the Portable Device, its CPU creates a Dynamic Local text box, displays it overlaid on the web page image at the same position as the primary Text Box, enables it and activates the visual cues indicating to the user that it is available and ready to receive text input. The transmission from the Proxy server to the Portable Device of identifying information for the web page's other Text Boxes—such as their graphic locations, their sizes, their preliminary content, their preliminary cursor positions and the features of their scrollbar(s) and drop-down menus, if any—is assigned second priority, over any of the non text-box content for the web page, as soon as a Text Box is detected. Once identifying information for a non-primary Text Box is received by the Portable Device, its CPU creates a corresponding Dynamic Local text box and displays it overlaid on the web page image at the same position as its corresponding Text Box. If the Proxy server is already sending data for non text-box parts of the web page image to the Portable Device, it momentarily interrupts this transmission to rather communicate identifying information for the Text Box just detected, after which it continues to relay data for the remainder of the web page image or information for other Text Boxes.

Just like the Dynamic Local text box corresponding to the primary Text Box, these Dynamic Local text boxes are readily available for receiving text input upon their creation. However, unlike the Dynamic Local text box corresponding to the primary Text Box, these other Dynamic Local text boxes are not enabled: if the user types text right after loading the web page, text data input is only entered in the—enabled—Dynamic Local text box corresponding to the primary Text Box, not in those other Dynamic Local text boxes—which are disabled. Enablement can be transferred readily by clicking on another Dynamic Local text box or pressing "TAB", upon which the newly enabled Dynamic Local text box receives any text input by the user. If there is no currently enabled Dynamic Local text box, enablement is triggered with the user clicking on one of the Dynamic Local text boxes.

Since Dynamic Local text boxes are created locally by the Portable Device's CPU, switching their enablement is also processed locally and thus instantaneously. From the point of view of the user, the moment a specific Dynamic Local text box is created—and they are created in priority when a web page is loaded—only a simple click is required before text input can immediately be entered therein. The Proxy server is not involved in any way in those steps.

In this embodiment, this priority order is enforced for every data transmission from the Proxy server to the Portable Device for a newly accessed web page. This way, this embodiment of the invention maintains the benefits of the prior art's priority order: when network congestion imposes a lag on communications between the web page server and the Proxy server, this inconvenience is partly circumvented by having the Proxy server informing the Portable Device in priority about the information necessary to create and display the Dynamic Local text box corresponding to the primary Text Box. This priority order allows the user to enter text at the Portable Device for the Dynamic Local text box that corresponds with the primary Text Box as soon as possible, even if the rest of the web page image is not yet displayed. Moreover, since information about other Text Boxes is sent as a second priority, and their corresponding Dynamic Local text boxes are created upon reception of this information in accordance with this invention, the user can click sooner on another Dynamic Local text box in order to enter text therein. As a result of typing and display in a Dynamic Local text box being processed locally by the Portable Device's CPU, the text data input entered by the user in the newly enabled Dynamic Local text box is also displayed directly and immediately on the Portable Device's screen. In the prior art method, the user is initially confined to the Dynamic Local text box that corresponds with the primary Text Box, and enabling another Dynamic Local text box requires operations at the Proxy server.

In this embodiment, all of the Dynamic Local text boxes created by the Portable Device's CPU overlay the web page image whose parts have been sent from the Proxy server. So long as the web page is navigated, these Dynamic Local text boxes remain in position and display their preliminary content and any text input or editing entered previously by the user. The images of Text Boxes, whose positions are the same as those of the Dynamic Local text boxes, are thus never sent to the Portable Device.

When a Dynamic Local text box is newly enabled, this enablement is visually represented with cues indicating that this Dynamic Local text box is available and ready for typing, after deactivating these same visual cues from the previously enabled Dynamic Local text box—if there was one. Moreover, when the user performs an action that switches enablement, information about it is communicated from the Portable Device to the Proxy server, which is able to establish to which Text Box the active status should be granted. When the Proxy server receives and processes this signal, it activates this Text Box, after removing active status from the previously active Text Box—if there was one.

Because actions on the Portable Device are immediate whereas communications to the Proxy server can be subject to lags due to network congestion, it is possible in this invention, unlike in the prior art method, that the currently enabled Dynamic Local text box does not correspond with a currently active Text Box at a given moment. These shorts intervals can happen, for instance, when the signal to remove active status from the currently active Text Box and to grant it to the Text Box corresponding with the currently enabled Dynamic Local text box has not yet been received or processed by the Proxy server because of network congestion.

Unlike in the prior art method, text data in an enabled Dynamic Local text box in the Portable Device is transmitted along in vector or ASCII data to its corresponding Text Box in the Proxy server as the user types in or edits the content of the Dynamic Local text box. Upon reception, which could be delayed, the Text Box is updated by merging the preliminary or previously-saved content in the Text Box, if any, with the content just received from the Dynamic Local text box. If there is no preliminary or previously-saved content inside the Text Box, it is updated by simply incorporating the content just received from the Dynamic Local text box.

Principal Embodiment—Drop-Down Menu Managed Locally

As mentioned, among identifying information for a Text Box that the Proxy server sends to the Portable Device for the creation of its corresponding Dynamic Local text box, the Proxy server also informs the Portable Device about the features of any drop-down menu that might be integrated to that Text Box. Some drop-down menus adjust their content on the basis of the content currently typed or edited in the text boxes to which they are linked. In those cases, the web page's designers have ascribed to the drop-down menu a specific algorithm that determines the items listed therein based on the possibilities of content typed in its attached text box. The information sent by the Proxy server to the Portable device about a Text Box's drop-down menu includes its graphic location, its size, its preliminary content, the algorithm(s) by which it is managed, hovering effects, the actions that occur if one of its options is clicked on (strictly update the content of the Text Box, load a new web page, etc.) and the features of its scrollbar(s), if any. With this information, the Portable Device is able to locally manage drop-down menus.

If a drop-down menu is attached to the enabled Dynamic Local text box, and its content or display varies on the basis of the content of its attached Dynamic Local text box, the Portable Device locally updates the content and display of this drop-down menu. By processing the updated content of the enabled Dynamic Local text box through the underlying algorithm(s) of this drop-down menu, the Portable Device's CPU determines or updates the items to be listed or displayed in the drop-down menu. On the one hand, if the drop-down menu was not yet rendered, the Portable Device displays it below its attached Dynamic Local text box and overlaying any other previously displayed element (including another Dynamic Local text box). The Portable Device's CPU processes the content of said Dynamic Local text box and thereupon inserts the elements to be listed in the drop-down menu that is displayed this way. On the other hand, if the drop-down menu was already rendered, the Portable Device's CPU simply processes the content of the enabled Dynamic Local text box as the user keeps typing, and the Portable Device's CPU continuously updates the elements to be listed in the drop-down menu already displayed. As the user's text input in the enabled Dynamic Local text box is continuously transmitted as vector or ASCII content to the corresponding Text Box in Proxy server, the Proxy server also displays a drop-down menu on its virtual display. If the user clicks on one of the options listed in the drop-down menu, a Typing Interruption Prompt is triggered.

Information for all Text Boxes Sent Immediately—Sequences of Events Triggered by Typing Interruption Prompts The consequences of triggering a Typing Interruption Prompt vary, but the first steps are common to all Typing Interruption Prompts. When a Typing Interruption Prompt is triggered with this invention, the Portable Device's CPU immediately disables the then-enabled Dynamic Local text box. If a drop-down menu was displayed on the Portable Device's screen, the Portable Device stops rendering this drop-down menu, and it is replaced in the display screen with the image elements that the drop-down menu previously overlaid. If the Typing Interruption Prompt resulted from the user clicking on a listed element of the drop-down menu, the vector or ASCII content of the Dynamic Local text box is replaced by the vector or ASCII content of this element, and the Portable Device's CPU thereby processes this content to display the correct text in the Dynamic Local text box. Moreover, visual cues indicating to the user that said Dynamic Local text box is enabled are removed by the Portable Device's CPU. Since all of these operations are processed locally by the Portable Device, they are executed instantaneously upon the Typing Interruption Prompt being triggered. Depending on the specific click or command that caused the Typing Interruption Prompt, three sequences of events could follow. In all of these sequences, the content of the currently active Text Box is eventually updated, by merging its preliminary or previously-saved content, if any, with the content or editing received during the sequence from its corresponding, then-enabled Dynamic Local text box.

The first sequence occurs if the user presses a command key whose effect is strictly to update the content of the Text Box corresponding to the then-enabled Dynamic Local text box; if the user clicks on a command button whose effect is strictly to update the content of said Text Box; if the user clicks on an option of the drop-down menu, if any, whose featured effect is strictly to update the content of said Text Box, or if the user clicks on the web page image on neither a command button, the drop-down menu or an area of the Portable Device's screen where a Dynamic Local text box is displayed. Here, the user's action is communicated by the Portable Device to the Proxy server, with the current vector or ASCII content of the just disabled Dynamic Local text box. After processing queued operations, the Proxy server then updates the content of the corresponding Text Box, to which the active status is subsequently removed.

If the user presses a command key whose effect is to request a new web page; clicks on a command button whose effect is to request a new web page, or clicks on an option of the drop-down menu, if any, whose featured effect is to request a new web page, the second sequence is initiated. In this case, the user's action is communicated by the Portable Device to the Proxy server, with the current vector or ASCII content of the just disabled Dynamic Local text box. After processing queued operations, the Proxy server updates the content of the corresponding Text Box, interprets the user's action as a request for a new web page and executes this request by having its browser load a new web page.

The third sequence happens if the user presses on the "TAB" command key or clicks on an area of the Portable Device's screen where another Dynamic Local text box is displayed. In that case, the Dynamic Local text box next in priority line in the web page's hierarchic configuration or just clicked on, depending on the action that triggered the Typing Interruption Prompt, is enabled immediately after the steps common to all Typing Interruption Prompts. The enablement of this Dynamic Local text box is visually represented with cues, as described in the prior art method, that indicate to the user that it is available and ready to receive text. The Portable Device also signals to the Proxy server that the active status should be granted to the Text Box corresponding with the newly enabled Dynamic Local text box, along with the current vector or ASCII content of the just disabled Dynamic Local text box. After processing queued operations, the Proxy server updates the content of the corresponding Text Box, deactivates it and grants active status to the Text Box corresponding with the newly enabled Dynamic Local text box.

Alternate Embodiment—Information for all Text Boxes Sent at the End

In one alternate embodiment, anytime a new web page is loaded on the Proxy server's virtual display, the order of priority described in the previous embodiment of this invention is different. In the present embodiment, blocks of the web page image are transferred from the Proxy server to the Portable Device as the first priority of data transmission, rather than in the last. After all the blocks of data for the web page image rendered on the Proxy server's virtual display have been transmitted to the Portable Device, the Proxy server communicates to the Portable Device the information necessary for the Portable Device's CPU to create and display Dynamic Local text boxes for all Text Box images sent to the Portable Device in the first priority. Among those sets of information, information identifying the primary Text Box, if there is one and once it is detected, is sent in second priority over information for other Text Boxes. Still in the second priority, if information for a primary Text Box is received by the Portable Device, its CPU creates a Dynamic Local text box, displays it overlaid on the web page image at the same position as the primary Text Box, enables it and activates the visual cues indicating to the user that it is immediately available and ready to receive text input. In last priority, for each of the other sets of information sent to the Portable Device regarding initially inactive Text Boxes, the Portable Device's CPU creates a Dynamic Local text box and displays it overlaid on the web page image at the same position as its corresponding Text Box. The rest of the principal embodiment of this invention applies normally to this alternate embodiment. Thus, in this embodiment as well, once Dynamic Local text boxes are created, they remain overlaid, with respect to the web page image, throughout the user's navigation of the web page. In addition, enablement can still be transferred readily by clicking on another Dynamic Local text box or pressing "TAB", upon which the newly enabled Dynamic Local text box is able to instantaneously receive any text input by the user and display it on the screen of the Portable Device. In this embodiment, the images of Text Boxes, whose positions are the same as those of their corresponding Dynamic Local text boxes, could be sent to the Portable Device in the first priority. If they are sent, though, they are only rendered during the short interval between the first-priority initial transmission of data from the Proxy server to the Portable Device and the second- and third-priority moments when information identifying each of these Text Boxes is sent to the Portable Device in a way that allows its CPU to create and display their corresponding Dynamic Local text boxes.

Alternate Embodiment—Drop-Down Menu Managed by the Proxy Server

For some drop-down menus that adjust their content on the basis of the content currently typed or edited in the text boxes to which these drop-down menus are linked, the integrated algorithm(s) may be too elaborate for the Portable Device's CPU. As a result, the Portable Device is not capable of efficiently managing the drop-down menu. In this alternate embodiment of the present invention, the identifying information sent to the Portable Device for some Text Boxes does not include information about the features of their drop-down menus, and the drop-down menus of those Text Boxes are managed by the Proxy server instead.

As described above, when text input is typed in an enabled Dynamic Local text box, this input is continually transmitted as vector or ASCII content to the corresponding active Text Box in the Proxy server. When a drop-down menu for this Dynamic Local text box is managed at the Proxy server rather than locally at the Portable Device, the Proxy server renders it on its virtual display, immediately below the active Text Box and overlaying any other element that was virtually displayed beforehand. As the active Text Box receives content from the Portable Device, the Proxy server processes this content and thereupon inserts in the drop-down menu the items to be listed and virtually displayed therein, these items being determined by the algorithm of the drop-down menu. The Proxy server then takes a snapshot image of this drop-down menu and sends it in compressed image parts to the Portable Device. Upon its reception of those image parts, the Portable Device decompresses them and stores them into a cache memory. The GUI system of the Portable Device displays these stored image parts for the drop-down menu when their graphic display coordinates are currently displayed on the Portable Device's screen. When displayed, these image parts are positioned immediately below the enabled Dynamic Local text box to which the drop-down menu is linked, occupying the same area as the actual drop-down menu in the virtual display of the Proxy server. They overlay any other element of the web page image so long as the Dynamic Local text box to which these drop-down menu images are attached remains enabled.

As a user continues typing, and text input data is continually transmitted from the Portable Device to the Proxy server, the Proxy server keeps on processing the content of the Text Box. After updating the elements to be listed in the drop-down menu on its virtual display, the Proxy server sends updated image parts to the Portable Device, which image parts are also stored into the Portable Device and selectively displayed on a screen thereof.

In this embodiment, if a user clicks on an element of the drop-down menu image that is displayed on the Portable Device's screen, this click triggers a special Typing Interruption Prompt. First, the Portable Device immediately disables the then-enabled Dynamic Local text box and stops displaying image parts of the drop-down menu, which are replaced on the display screen with the elements that those images for the drop-down menu previously overlaid. Visual cues indicating that this Dynamic Local text box is enabled are also removed by the Portable Device's CPU. Then, the graphic display coordinates of this click are transmitted to the Proxy server, which interprets it as a click on an item of the drop-down menu virtually displayed by the Proxy server's browser. The vector or ASCII content of the Text Box virtually displayed onto the Proxy server is replaced by the vector or ASCII content of the item clicked on, which is processed by the Proxy server's browser. If the featured effect of the drop-down menu upon one of its items being clicked on is strictly to update the content of its attached Text Box, the Proxy server subsequently sends vector or ASCII data to the Portable Device so that its CPU can process and update the content of the corresponding Dynamic Local text box with this text data input. If the featured effect of the drop-down menu upon one of its items being clicked on is rather to request a new web page, the Proxy server executes this request by having its browser load a new web page as described above. The sequences of events that follow from the other user actions that trigger Typing Interruption Prompts are the same in this alternate embodiment as in the principal embodiment described above.

Since this embodiment's particular operations take place through communications with the Proxy server, the display and updates of drop-down menus—to be accurate, images of drop-down menus—in accordance with this alternate embodiment are not as instantaneous as the rendering and updates of a locally-managed drop-down menu. Still, back-end operations with respect to this embodiment of the drop-down menu do not delay or interrupt the user from typing or editing in the enabled Dynamic Local text box, immediately switching enablement to another Dynamic Local text box or otherwise signalling to the Proxy server that typing in a Dynamic Local Text Box is Complete.

Detailed Example—Information for all Text Boxes Sent Immediately

An example of the invention is now described with reference to the figures. The figures are intended to be illustrative rather than limiting and are included herewith to facilitate the explanation of the invention.

One example of a network in which the present invention can be implemented is disclosed in FIG. 1, in which the user of a Portable Device navigates through the Internet and World Wide Web using a browser running at a Proxy server. A web page server 1 offers access to a web page. A wireless network connects this web page server 1 to a remote Proxy server 2 located in a server farm 3. This Proxy server 2 is running a web browsing application 4, which loads data from the web page server 1 and virtually saves a bitmap image of what would be the corresponding GUI display for that web page. The Proxy server 2 then divides that web page image into different elements and sends compressed blocks of data representing these elements to a Portable Device 6 across a wireless network, for instance passing through a cellular telephone link 5. The Portable Device 6 receives the blocks of data, decompresses them, stores them into its memory and displays them on its screen 7. The Portable Device 6 also incorporates an integrated keypad 8 for user input.

The principal embodiment of the present invention is illustrated on FIGS. 2, 3, 4, 5, 6, 7 & 8, where the content of the Dynamic Local text boxes L1, L2 & L3 rendered in the screen 7 of the Portable Device 6 is simultaneously depicted along with the content of Text Boxes T1, T2 & T3 in the browser 4, which is running inside the Proxy server 2.

Detailed Example—Loading of a New Web Page

Figure 2:
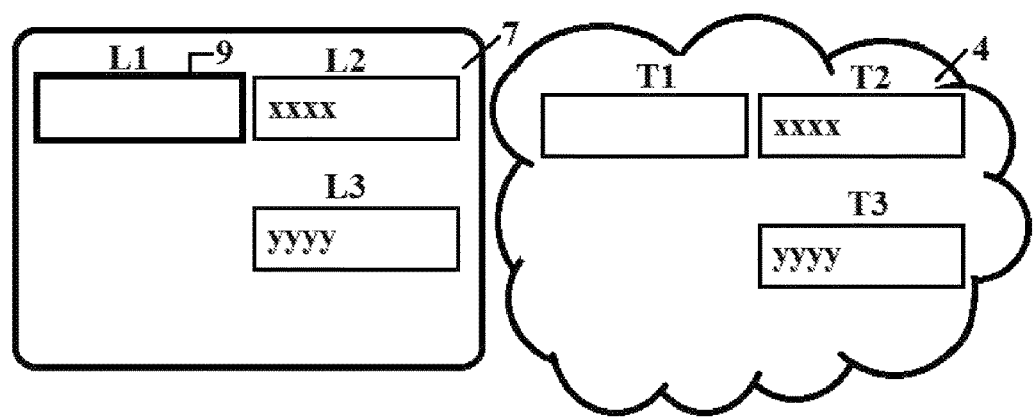
FIGS. 2-8 are schematic drawings illustrating the simultaneous contents of Text Boxes in the Proxy server and their equivalent Dynamic Local text boxes in the Portable Device as the user navigates a web page, according to the present invention.

On the situation illustrated on FIG. 2, the user has requested a web page, which has been loaded by the Proxy server's browser 4. In this example, the browser first divides the web page image on the basis of its HTML elements and detects three Text Boxes: T1, T2 & T3. Based on information received from the web page server, the Proxy server's browser 4 is aware that Text Box T1 is active by default when the web page is loaded, making it the web page's primary Text Box. Once the Proxy server's browser 4 has been made aware of Text Box T1's location and status as the primary Text Box, the Proxy server 2 sends as a first priority to the Portable Device 6 information identifying this primary Text Box T1: its graphic location, its size, its preliminary content, its preliminary cursor position and the features of its scrollbar(s) and drop-down menu, if any. For the purpose of this example, Text Box T1 has neither preliminary content nor scrollbars, but it features a drop-down menu locally managed by the Portable Device, so the Proxy server 2 also sends to the Portable Device information about the settings of this drop-down menu. The CPU of the Portable Device 6 then creates Dynamic Local text box L1 and displays it in the web page image stored in the Portable Device 6, overlaying the location occupied by Text Box T1 on the virtual display of the Proxy server's browser 4. Simultaneously and throughout the user's navigation of the web page, a copy of this web page image and its overlaid objects is stored into a display memory of the Portable Device 6, from which the GUI system of the Portable Device displays the web page on the Portable Device's screen 7. The drop-down menu associated with Dynamic Local text box L1 is not yet displayed because, in this example, its content depends on the user's input, and no text input has been entered by the user at this moment. Immediately after it is created by the CPU of the Portable Device 6, this Dynamic Local text box L1 is enabled. To indicate to the user that it is available and ready to receive and display text input instantaneously, visual cues are activated—in this example, any enabled Dynamic Local text box is delineated with a bold perimeter 9.

Shortly afterward, having also detected two other Text Boxes (T2 & T3), the Proxy server's browser sends information to the Portable Device regarding their graphic locations, their sizes, their preliminary content, their preliminary cursor positions and the features of their scrollbar(s) and drop-down menus, if any. For the purpose of this example, Text Boxes T2 & T3 have neither scrollbars nor drop-down menus, but they have preliminary vector or ASCII content—whose textual representations respectively yield xxxx and yyyy—and their cursors are preliminarily positioned after these preliminary contents. After receiving this information, the CPU of the Portable Device 6 creates Dynamic Local text boxes L2 & L3, inserts into each of them their respective initial content and displays them at the same positions as Text Boxes T2 & T3 on the virtual display of the Proxy server's browser 4. Although Dynamic Local text boxes L2 & L3 are available and would be readily able to receive and display text input instantaneously upon their enablement, they are initially disabled.

Identifying information for all of the web page's Text Boxes having been sent, the Proxy server 2 sends blocks of data to the Portable Device 6 regarding images of the various elements in the web page, first, for the display area of the Portable Device 6. It would follow with data and information for a neighboring field around the displayable area of the Portable Device 6, where identifying information for Text Boxes would here as well be communicated in priority for the Portable Device 6 for its CPU to create corresponding Dynamic Local text boxes. These blocks and Dynamic Local text boxes would be saved in the display memory of the Portable Device 6 for this web page and would be ready to be instantly displayed on the Portable Device's screen 7 from this display memory should the user scroll over them.

Detailed Example—Entering Text Input &
Drop-Down Menu

Figure 3:
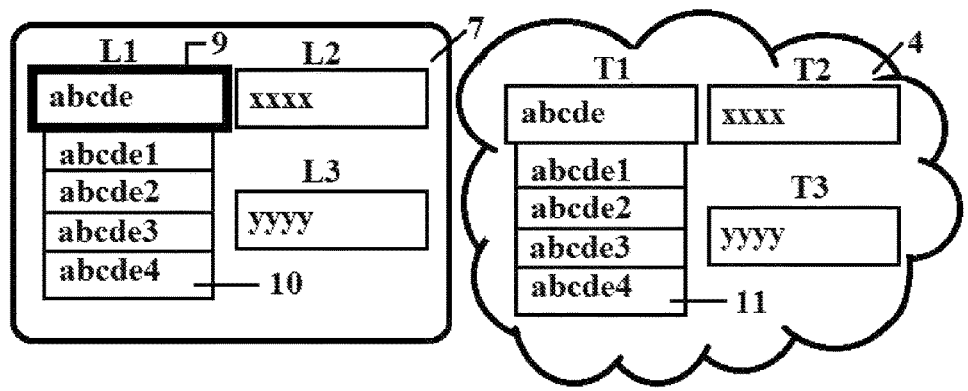
Figure 4:
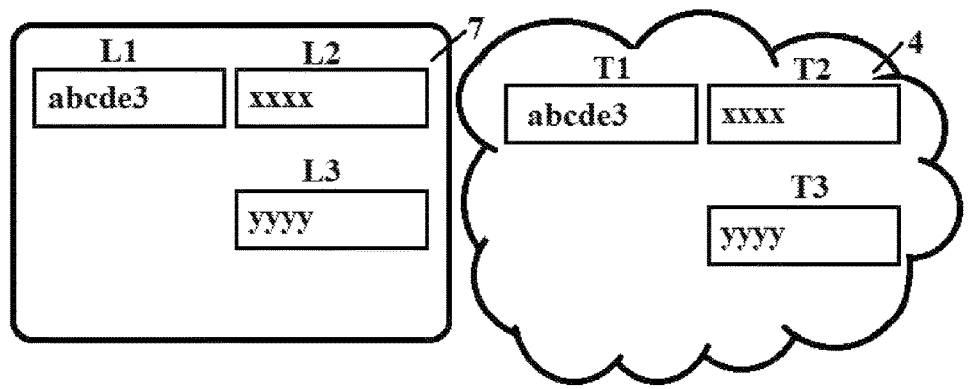

As a first action, illustrated on FIG. 3, the user types some text input: abcde. Since Dynamic Local text box L1 is enabled, this text is entered therein in vector or ASCII format, and the CPU of the Portable Device 6 immediately processes and displays this text input into Dynamic Local text box L1. This text input initiates the drop-down menu 10 of Dynamic Local text box L1 in the Portable Device 6. Based on the web page's features and algorithm for this drop-down menu 10, which were received along with information identifying Text Box T1, text input abcde triggers four items to be listed: abcde1, abcde2, abcde3 & abcde4. This drop-down menu 10 is overlaid on the web page image for this web page, thereby updating the image stored into a display memory of the Portable Device 6, from where the web page image is displayed on the Portable Device's screen 7. Subsequently, the Portable Device 6 sends the vector or ASCII content of Dynamic Local text box L1 to the Proxy server 2. The Proxy server's browser 4 processes this content just received from the Portable Device 6 and inserts the computed text, abcde, into Text Box T1, the Text Box corresponding with Dynamic Local text box L1. This text input also triggers the Proxy server's browser 4 to activate and virtually display the Text Box T1's drop-down menu 11, in the same manner as the drop-down menu 10 displayed on the Portable Device's screen 7 since they share the same settings and features.

Detailed Example—Typing Interruption Prompt
(Clicking on an Item of the Drop-Down Menu)

Next, in this example, the user clicks on one of the items listed in the drop-down menu 11, abcde3. This click triggers a Typing Interruption Prompt whose effect is strictly to update the content of the Text Box T1. The sequence of this Typing Interruption Prompt is described with reference to FIG. 4. The CPU of the Portable Device 6 immediately disables Dynamic Local text box L1. Then, the Portable Device 6 stops rendering the drop-down menu 10 (seen in FIG. 3) in the display screen 7, where it is instead replaced by the image elements, if any, that the drop-down menu 10 previously overlaid. As the Typing Interruption Prompt results from the user clicking on a listed element of the drop-down menu 10, the vector or ASCII content of Dynamic Local text box L1, which yielded the text input abcde, is replaced by the vector or ASCII content of this listed element clicked upon. The CPU of the Portable Device 6 thereby processes this content to display the correct text, abcde3, in Dynamic Local text box L1, which is rendered on the screen 7 of the Portable Device 6. Moreover, the bolder rectangle 9 (in FIG. 3) that indicated to the user that Dynamic Local text box L1 was enabled is removed by the CPU of the Portable Device 6. Because all of these operations take place locally at the Portable Device 6, they are processed instantaneously, without delay. Subsequent to these local steps, the current vector or ASCII content of Dynamic Local text box L1 just disabled is transmitted to and received by the currently active Text Box T1 in the Proxy server 2, along with accompanying instructions to remove active status from Text Box T1. The Proxy server's browser 4 processes this content and replaces Text Box T1's virtually displayed text, abcde, for the updated text abcde3. It also removes active status from Text Box T1 as instructed, after which the drop-down menu 11 (seen in FIG. 3) attached to Text Box T1 stops being rendered on the virtual display of the Proxy server's browser 4.

Detailed Example—Typing Interruption Prompt
(Clicking on Another Text Box)

Figure 5:
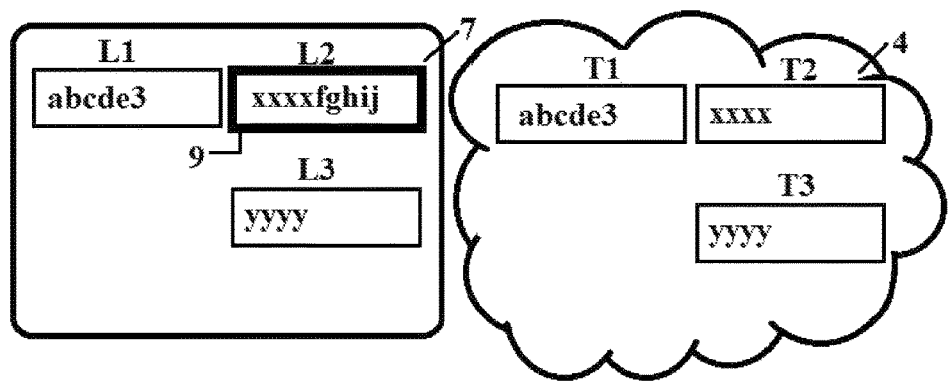

In this example, in order to continue filling in the web page's Text Boxes, the user clicks on Dynamic Local text box L2, as pictured in FIG. 5. Immediately upon performing this click, the Portable Device 6 enables Dynamic Local text box L2, allowing text input subsequently typed by the user to be instantaneously received by the Portable Device 6 and displayed on its screen 7. To indicate to the user that Dynamic Local text box L2 is now available and ready for typing, the CPU of the Portable Device 6 delineates Dynamic Local text box L2 with a bold perimeter 9, which visual cue is displayed in the web page image currently rendered in the Portable Device's screen 7. Afterward, the Portable Device 6 signals the Proxy server 2 to activate Text Box T2.

In order to underscore that typing and display are mostly unaffected by network congestion in this invention, it is hereby assumed, for the purpose of this example, that there is network congestion now interfering and delaying the reception of this signal by the Proxy server 2. Therefore, Text Box T2 is not yet activated. The user thereafter types in fghij, which text input is processed immediately and locally by the CPU of the Portable Device 6 and thus instantaneously displayed in Dynamic Local text box L2. This text input is positioned after and merged with the text previously entered therein, xxxx. This default position of the user's text input is based on the initial position of the cursor in Dynamic Local text box L2. The Portable Device 6 transmits vector or ASCII content to the Proxy server 2 so that the content of Text Box T2 can be updated with the text typed in by the user, but this transmission is also delayed by network congestion for the purpose of this example.

Detailed Example—Typing Interruption Prompt
(Pressing Tab)

Figure 6:
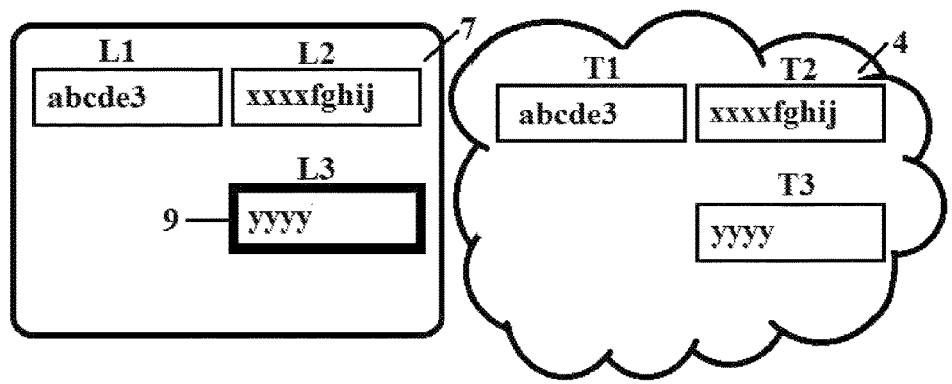

To continue filling in the form of this web page, the user presses the "TAB" command key, thereby triggering another Typing Interruption Prompt. The network is still congested. FIG. 6 illustrates the sequence of events that result from it. First, the CPU of the Portable Device 6 disables Dynamic Local text box L2 in order to immediately enable Dynamic Local text box L3 as it corresponds with the next Text Box in the web page's priority line, T3 in this example. This way, text input subsequently typed by the user is instantaneously received by the Portable Device 6 and displayed on its screen 7. The bolder rectangle 9 (in FIG. 5) that indicated to the user that Dynamic Local text box L2 was enabled is removed by the CPU of the Portable Device 6. Instead, the CPU of the Portable Device 6 delineates Dynamic Local text box L3 with a bold perimeter 9 to indicate to the user that it is now this Dynamic Local text box that is available to receive and display text input instantaneously. This visual cue is displayed in the web page image currently rendered in the Portable Device's screen 7. Because all of these operations take place locally at the Portable Device 6, they are processed instantaneously, without delay. Subsequent to these local steps, the Portable Device 6 transmits vector or ASCII content to the Proxy server 2 so that the content of Text Box T2 can be updated, along with the instructions to remove active status from Text Box T2 and grant it to Text Box T3, but the reception of this communication is delayed too by network congestion.

Figure 7:
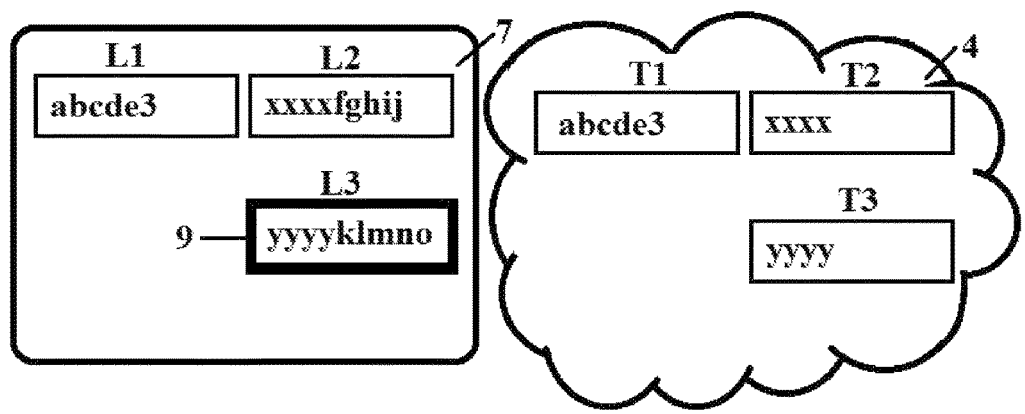

Afterward, as illustrated in FIG. 7, the user types in klmno. Since Dynamic Local text box L3 is enabled, vector or ASCII content for this text input is immediately entered into Dynamic Local text box L3, positioned after and merged with the preliminary content for Dynamic Local text box L3. This default position of the user's text input is based on the initial position of the cursor in Dynamic Local text box L3. The CPU of the Portable Device 6 immediately processes this input so that yyyyklmno is instantaneously displayed inside Dynamic Local text box L3 on the Portable Device's screen 7. In real time and from the user's perspective, even if the user typed this text right after pressing "TAB" and despite network congestion, this invention's Portable Device 6 succeeds in instantaneously displaying the text just typed in since switching enablement between Dynamic Local text boxes, processing text input data and displaying text are all executed locally at the Portable Device 6, without intervention by the Proxy server 2.

Figure 8:
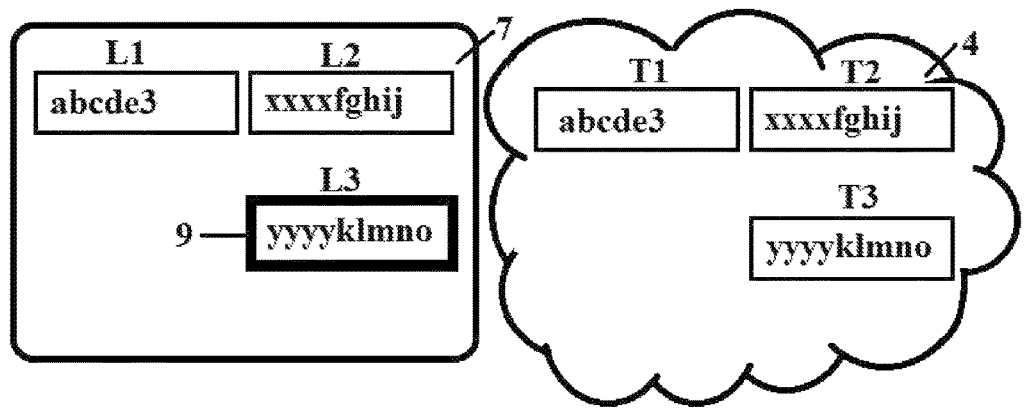

Thereafter, the Portable Device 6 transmits vector or ASCII content for the Dynamic Local text box L3 to the Proxy server 2, so that the content of Text Box T3 can be updated with the text typed in by the user. For the purpose of this example, the final step of which is illustrated in FIG. 8, it is assumed that the network stops being congested around this moment, so the Proxy server 2 now receives the successive communications previously sent from the Portable Device 6. Processing each of these communications in the order they were sent, the Proxy server's browser 4, successively and in the following order, activates Text Box T2; replaces Text Box T2's preliminary content with the updated vector or ASCII content just received with respect to Dynamic Local text box L2; processes this content and virtually displays the updated text of Text Box T2, xxxxfghij, on the virtual display of the Proxy server 2; removes active status from Text Box T2 and instead grants it to Text Box T3; replaces Text Box T3's preliminary content with the updated vector or ASCII content just received with respect to Dynamic Local text box L3; and processes this content and virtually displays the updated text of Text Box T3, yyyyklmno, on the virtual display of the Proxy server 2.

While this invention has been particularly shown and described with reference to an exemplary embodiment, it will be understood by those skilled in the art that various changes in form and detail may be made therein without departing from the spirit and scope of the invention. The invention in its broadest, and more specific aspects, is further described and defined in the claims which now follow.

I claim:

1. A system comprising:
a host computer receiving information from an outside source, rendering onto a virtual display an image of the information, and selectively transmitting in a compressed format a portion of the image to a portable device capable of receiving it, decompressing it, storing it into memory and displaying a part of said portion of the image onto a display screen of the device, which device is coupled to the host computer through a communication link;
wherein, the host computer sends information to the device identifying at least one text box element in said image, which identifying information comprises the graphic display coordinates and the size of said text box elements;
wherein, each time the device receives from the host computer information identifying a text box element in the image rendered onto a virtual display of the host computer, a software program running on the device thereupon creates a text box locally managed by said software program;
wherein locally-managed text boxes are displayed on a screen of the device when their graphic display coordinates are positioned in said part of the portion of the image that was or will be transmitted from the host computer to the device and that is or will be displayed on a screen of the device;
wherein, if a locally-managed text box is selected to receive text input entry or editing, any text input by a user is immediately rendered in said selected text box locally managed by a software program of the device; and
wherein, as a user inputs text into a locally-managed text box, the device transmits data associated with this text input to the host computer, which thereafter relies on the data just received to update the text data content of the corresponding text box element in the image rendered onto a virtual display of the host computer.

2. The system as claimed in claim 1 wherein locally-managed text boxes are selected to receive text input entry or editing either by a user input or by default configuration from the outside source.

3. The system as claimed in claim 1 wherein information identifying at least one text box element in the image rendered onto a virtual display of the host computer is sent by the host computer to the device immediately or shortly upon its reception by the host computer from an outside source.

4. The system as claimed in claim 3 wherein information identifying at least one text box element in the image rendered onto a virtual display of the host computer is sent by the host computer to the device in priority over the portion of said image that is transmitted to the device.

5. The system as claimed in claim 1 wherein if configuration from the outside source would cause a locally-managed text box to be selected by default to receive text input entry or editing, information identifying the corresponding text box element in the image rendered onto a virtual display of the host computer is sent by the host computer to the device immediately or shortly upon its reception by the host computer from an outside source, and this identifying information is sent to the device in priority over information identifying any other text box element in said image rendered onto a virtual display of the host computer.

6. The system as claimed in claim 5 wherein if configuration from the outside source would cause a locally-managed text box to be selected by default to receive text input entry or editing, information identifying the corresponding text box element in the image rendered onto a virtual display of the host computer is sent by the host computer to the device in priority over information identifying any other text box element in said image rendered onto a virtual display of the host computer and over the portion of said image that is transmitted to the device.

7. The system as claimed in claim 1 wherein the host computer sends information to the device identifying every text box element in the image rendered onto a virtual display of the host computer, which information comprises the graphic display coordinates and the size of said text box elements.

8. The system as claimed in claim 1 wherein information identifying text box elements in the image rendered onto a virtual display of the host computer comprises the preliminary content and the preliminary cursor position of said text box elements, as well as the features of their scrollbar or scrollbars and drop-down menu, if any.

9. The system as claimed in claim 1 wherein locally-managed text boxes that are displayed on a screen of the device overlay the part of the portion of the image that was or will be transmitted from the host computer to the device and that is or will be displayed on a screen of the device.

10. The system as claimed in claim 1 wherein so long as the image rendered onto a virtual display of the host computer remains virtually displayed thereon, locally-managed text boxes that correspond to text box elements in said image rendered onto a virtual display of the host computer are displayed on a screen of the device when their graphic display coordinates are positioned in the part of the portion of the image that was or will be transmitted from the host computer to the device and that is or will be displayed on a screen of the device.

11. The system as claimed in claim 1 wherein upon the selection of any locally-managed text box to receive text input entry or editing, a visual signal that is displayed on a screen of the device is triggered, which visual signal remains until said locally-managed text box stops being selected to receive text input entry or editing.

12. The system as claimed in claim 1 wherein upon the selection of any locally-managed text box to receive text input entry or editing, the perimeter of said locally-managed text box is highlighted, which highlighting remains until said locally-managed text box stops being selected to receive text input entry or editing.

13. The system as claimed in claim 1 wherein upon the selection of any locally-managed text box to receive text input entry or editing, a blinking cursor is triggered inside said locally-managed text box, which blinking cursor remains until said locally-managed text box stops being selected to receive text input entry or editing.

14. The system as claimed in claim 1 wherein
if a locally-managed text box is currently selected to receive text input entry or editing, a user pressing on a command key at the device causes said locally-managed text box to immediately stop being selected to receive text input entry or editing; and
the host computer updates the text data content of the corresponding text box element in the image rendered onto a virtual display of the host computer.

15. The system as claimed in claim 14 wherein after the host computer updates the text data content of the text box element in the image rendered onto a virtual display of the host computer, the host computer sends a request for information to an outside source.

16. The system as claimed in claim 1 wherein
if a locally-managed text box is currently selected to receive text input entry or editing, a user clicking on a command button on a display of the device causes said locally-managed text box to immediately stop being selected to receive text input entry or editing; and
the host computer updates the text data content of the corresponding text box element in the image rendered onto a virtual display of the host computer.

17. The system as claimed in claim 16 wherein after the host computer updates the text data content of the text box element in the image rendered onto a virtual display of the host computer, the host computer sends a request for information to an outside source.

18. The system as claimed in claim 1 wherein
if a locally-managed text box is currently selected to receive text input entry or editing, a user clicking on a display of the device on neither a command button, a drop-down menu or a locally-managed text box causes said locally-managed text box to immediately stop being selected to receive text input entry or editing; and
the host computer updates the text data content of the corresponding text box element in the image rendered onto a virtual display of the host computer.

19. The system as claimed in claim 1 wherein
if a locally-managed text box is currently selected to receive text input entry or editing, a user pressing on the TAB command key at the device causes said locally-managed text box to immediately stop being selected to receive text input entry or editing, and another locally-managed text box is selected to immediately receive text input entry or editing; and
the host computer updates the text data content of the text box element in the image rendered onto a virtual display of the host computer that corresponds with the previously-selected locally-managed text box.

20. The system as claimed in claim 19 wherein the determination of the locally-managed text box that is newly selected is based on the information previously received by the host computer from an outside source for the image rendered onto a virtual display of the host computer.

21. The system as claimed in claim 1 wherein
if a locally-managed text box is currently selected to receive text input entry or editing, a user clicking on another locally-managed text box on a display of the device causes the initially-selected locally-managed text box to immediately stop being selected to receive text input entry or editing, and said locally-managed text box just clicked on is selected to immediately receive text input entry or editing; and
the host computer updates the text data content of the text box element in the image rendered onto a virtual display of the host computer that corresponds with the previously-selected locally-managed text box.

22. The system as claimed in claim 1 wherein
the device signals the host computer when a locally-managed text box is selected to receive text input entry or editing or stops being selected to receive text input entry or editing;

upon receiving said signal, the host computer respectively activates or deactivates the corresponding text box element in the image rendered onto a virtual display of the host computer; and so long as a text box element remains active in the image rendered onto a virtual display of the host computer, the text data content that is received at the host computer from the device is processed in said active text box element, and the virtual display of the host computer is updated accordingly.

23. The system as claimed in claim 22 wherein if a locally-managed text box is currently selected to receive text input entry or editing, a user pressing on a command key at the device sends a signal to the device to cause said locally-managed text box to immediately stop being selected to receive text input entry or editing; and the device informs the host computer about the user's action and transmits data associated with the current text input of said locally-managed text box to the host computer, which thereafter updates the text data content of the corresponding text box element in the image rendered onto a virtual display of the host computer and deactivates said corresponding text box element.

24. The system as claimed in claim 23 wherein after the host computer updates the text data content of the text box element in the image rendered onto a virtual display of the host computer, the host computer sends a request for information to an outside source.

25. The system as claimed in claim 22 wherein if a locally-managed text box is currently selected to receive text input entry or editing, a user clicking on a command button on a display of the device sends a signal to the device to cause said locally-managed text box to immediately stop being selected to receive text input entry or editing; and the device informs the host computer about the user's action and transmits data associated with the current text input of said locally-managed text box to the host computer, which thereafter updates the text data content of the corresponding text box element in the image rendered onto a virtual display of the host computer and deactivates said corresponding text box element.

26. The system as claimed in claim 25 wherein after the host computer updates the text data content of the text box element in the image rendered onto a virtual display of the host computer, the host computer sends a request for information to an outside source.

27. The system as claimed in claim 22 wherein if a locally-managed text box is currently selected to receive text input entry or editing, a user clicking on a display of the device on neither a command button, a drop-down menu or a locally-managed text box sends a signal to the device to cause said locally-managed text box to immediately stop being selected to receive text input entry or editing; and the device informs the host computer about the user's action and transmits data associated with the current text input of said locally-managed text box to the host computer, which thereafter updates the text data content of the corresponding text box element in the image rendered onto a virtual display of the host computer and deactivates said corresponding text box element.

28. The system as claimed in claim 22 wherein if a locally-managed text box is currently selected to receive text input entry or editing, a user pressing on the TAB command key at the device sends a signal to the device to cause said locally-managed text box to immediately stop being selected to receive text input entry or editing, and to select another locally-managed text box to immediately receive text input entry or editing; and the device informs the host computer about the user's action and transmits data associated with the current text input of the previously-selected locally-managed text box to the host computer, which thereafter updates the text data content of the text box element in the image rendered onto a virtual display of the host computer that corresponds with the previously-selected locally-managed text box, deactivates said corresponding text box element and activates the text box element in the image rendered onto a virtual display of the host computer that corresponds with the newly-selected locally-managed text box.

29. The system as claimed in claim 28 wherein the determination of the locally-managed text box that is newly selected is based on the information previously received by the host computer from an outside source for the image rendered onto a virtual display of the host computer.

30. The system as claimed in claim 22 wherein if a locally-managed text box is currently selected to receive text input entry or editing, a user clicking on another locally-managed text box on a display of the device sends a signal to the device to cause the initially-selected locally-managed text box to immediately stop being selected to receive text input entry or editing, and to select said locally-managed text box just clicked on to immediately receive text input entry or editing; and the device signals the host computer about the user's action and transmits data associated with the current text input of the previously-selected locally-managed text box to the host computer, which thereafter updates the text data content of the text box element in the image rendered onto a virtual display of the host computer that corresponds with the previously-selected locally-managed text box, deactivates said corresponding text box element and activates the text box element in the image rendered onto a virtual display of the host computer that corresponds with the locally-managed text box just clicked on.

31. The system as claimed in claim 22 wherein the host computer has sent or sends information to the device identifying at least a second text box element in the image rendered onto a virtual display of the host computer; and when a user input causes another locally-managed text box to be selected to receive text input entry or editing, the user can thereupon enter text input or editing into said other locally-managed text box, which text input entry or edit is immediately processed by the device and immediately displayed on a screen of the device without any intervention from the host computer and even though the host computer may not have yet received the communication from the device signalling that the text box element that is rendered onto a virtual display of the host computer and which corresponds to said other locally-managed text box should be activated.

32. The system as claimed in claim 1 wherein if a locally-managed text box is currently selected to receive text input entry or editing and the text box element in the image rendered onto a virtual display of the host computer that corresponds with said locally-managed text box features a drop-down menu, a user entering or editing text input causes a software program running on the device to thereupon create a drop-down menu that is locally managed by said software program; and said locally-managed drop-down menu is displayed on a screen of the device when its graphic display coordinates are positioned in the part of the portion of the image that was or will be transmitted from the host computer to the device and that is or will be displayed on a screen of the device.

33. The system as claimed in claim 31 wherein a locally-managed drop-down menu is managed by a software program running on the device in accordance with user text data input and with the information previously received from the host computer identifying the text box element in the image rendered onto a virtual display of the host computer that corresponds with the locally-managed text box that features said drop-down menu.

34. The system as claimed in claim 31 wherein a locally-managed drop-down menu that is displayed on a screen of the device overlays the part of the portion of the image that was or will be transmitted from the host computer to the device and that is or will be displayed on a screen of the device.

35. The system as claimed in claim 31 wherein if a locally-managed text box is currently selected to receive text input entry or editing and said locally-managed text box features a drop-down menu that is currently displayed on a screen of the device, a user clicking on an item of said drop-down menu causes said locally-managed text box to immediately stop being selected to receive text input entry or editing, while the text data input of said locally-managed text box is immediately replaced with the text data input of said item of the drop-down menu just clicked on, and said drop-down menu immediately stops being displayed; and the device informs the host computer about the user's action and transmits data associated with the current text input of said locally-managed text box to the host computer, which thereafter updates the text data content of the corresponding text box element in the image rendered onto a virtual display of the host computer and stops rendering its corresponding drop-down menu.

36. The system as claimed in claim 35 wherein after the host computer updates the text data content of the text box element in the image rendered onto a virtual display of the host computer, the host computer sends a request for information to an outside source.

37. The system as claimed in claim 31 wherein as the text data content of a text box element in the image rendered onto a virtual display of the host computer is updated, if its corresponding locally-managed text box is selected and features a drop-down menu locally managed at the device, the host computer creates and virtually displays a drop-down menu in the image rendered onto a virtual display of the host computer.

38. The system as claimed in claim 37 wherein a drop-down menu rendered onto a virtual display of the host computer is managed in accordance with user text data input received from the device and with the features of said drop-down menu as configured in the information received from the outside source.

39. The system as claimed in claim 37 wherein if a locally-managed text box is currently selected to receive text input entry or editing and said locally-managed text box features a drop-down menu that is currently displayed on a screen of the device, a user clicking on an item of said drop-down menu causes said locally-managed text box to immediately stop being selected to receive text input entry or editing, while the text data input of said locally-managed text box is immediately replaced with the text data input of said item of the drop-down menu just clicked on, and said drop-down menu immediately stops being displayed; and the device informs the host computer about the user's action and transmits data associated with the current text input of said locally-managed text box to the host computer, which thereafter updates the text data content of the corresponding text box element in the image rendered onto a virtual display of the host computer and stops rendering its corresponding drop-down menu.

40. The system as claimed in claim 39 wherein after the host computer updates the text data content of the text box element in the image rendered onto a virtual display of the host computer, the host computer sends a request for information to an outside source.

41. The system as claimed in claim 1 wherein as the text data content of a text box element in the image rendered onto a virtual display of the host computer is updated, if said text box element features a drop-down menu and if its corresponding locally-managed text box is currently selected to receive text input entry or editing, the host computer creates and displays a drop-down menu in said image rendered onto a virtual display of the host computer;

said drop-down menu rendered onto a virtual display of the host computer is managed in accordance with user text data input received from the device and with the features of said drop-down menu as configured in the information received from the outside source; and after each instance by which the content of said drop-down menu rendered onto a virtual display of the host computer is initially rendered or updated, the host computer transmits in a compressed format an image of said drop-down menu to the device, which decompresses it and displays it on a screen of the device when the graphic display coordinates of said image of the drop-down menu are positioned in the part of the portion of the image that was transmitted from the host computer to the device and that is displayed on a screen of the device.

42. The system as claimed in claim 41 wherein if a locally-managed text box is currently selected to receive text input entry or editing and a user clicks on an image of a drop-down menu, which image has been received from the host computer and is currently displayed on a screen of the device, said click causes said locally-managed text box to immediately stop being selected to receive text input entry or editing, and said image of a drop-down menu immediately stops being displayed on a screen of the device;

the device communicates the graphic display coordinates of the user's click to the host computer, which thereafter associates the graphic display coordinates of this click with an item of the drop-down menu rendered onto a virtual display of the host computer, replaces the text data content of the corresponding text box element in the image rendered onto a virtual display of the host computer with the text data content of said item of the drop-down menu that is associated with a user's click, and the host computer stops rendering said drop-down menu onto a virtual display; and the host computer thereafter sends the text data content of said text box element rendered onto a virtual display of the host computer to the device, which thereafter replaces the current text data content of the corresponding locally-managed text box with the text data content just received from the host computer.

43. A system comprising:

a host computer receiving information from an outside source, rendering onto a virtual display an image of the information, and selectively transmitting in a compressed format a portion of the image to a portable device capable of receiving it, decompressing it, storing it into memory and displaying a part of said portion of the image onto a display screen of the device, which device is coupled to the host computer through a communication link;

wherein, after transmitting to the device said portion of the image rendered onto a virtual display of the host computer, the host computer sends information to the device identifying at least one text box element in said image, which identifying information comprises the graphic display coordinates and the size of the text box elements;

wherein, each time the device receives from the host computer information identifying a text box element in the image rendered onto a virtual display of the host computer, a software program running on the device thereupon creates a text box locally managed by said software program;

wherein locally-managed text boxes are displayed on a screen of the device when their graphic display coordinates are positioned in said part of the portion of the image that was or will be transmitted from the host computer to the device and that is or will be displayed on a screen of the device;

wherein, if a locally-managed text box is selected to receive text input entry or editing, any text input by a user is immediately rendered in said selected text box locally managed by a software program of the device; and wherein, as a user inputs text into a locally-managed text box, the device transmits data associated with this text input to the host computer, which thereafter relies on the data just received to update the text data content of the corresponding text box element in the image rendered onto a virtual display of the host computer.

44. The system as claimed in claim 43 wherein if configuration from the outside source would cause a locally-managed text box to be selected by default to receive text input entry or editing, information identifying the corresponding text box element in the image rendered onto a virtual display of the host computer is sent by the host computer to the device in priority over information identifying any other text box element in said image rendered onto a virtual display of the host computer.

* * * * *